No. 814,342. PATENTED MAR. 6, 1906.
H. B. ATHA.
METHOD OF MAKING COMPOSITE GEARS.
APPLICATION FILED NOV. 23, 1904
2 SHEETS—SHEET 1.
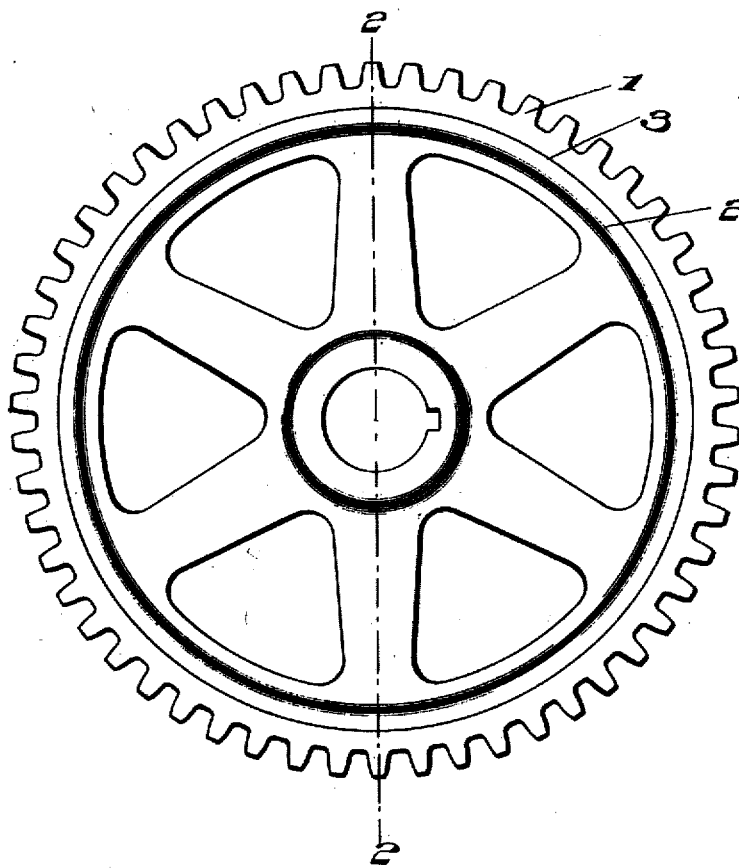

No. 814,342. PATENTED MAR. 6, 1906.
H. B. ATHA.
METHOD OF MAKING COMPOSITE GEARS.
APPLICATION FILED NOV. 23, 1904.
2 SHEETS—SHEET 2.
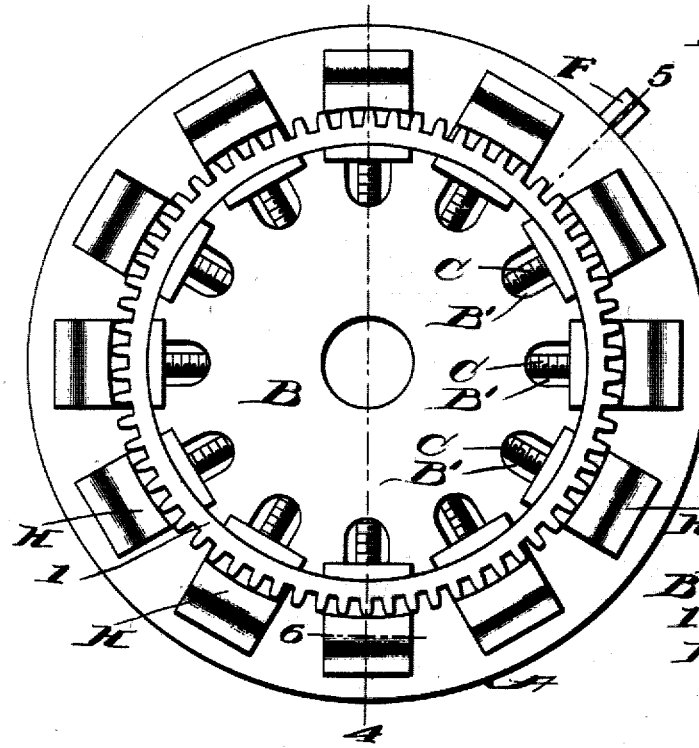
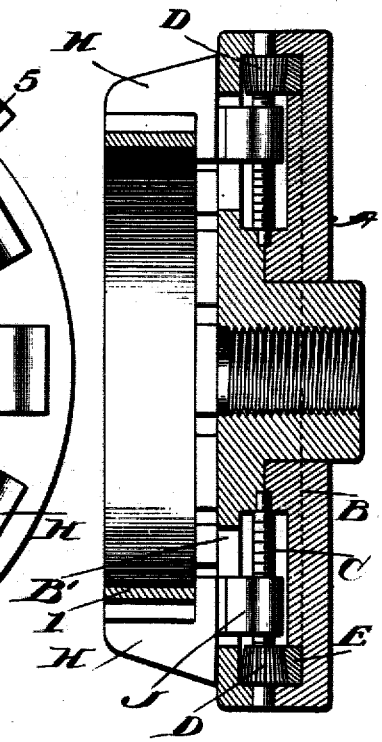
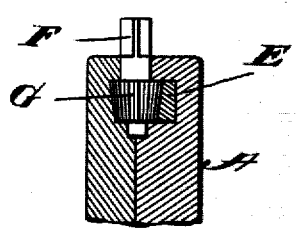
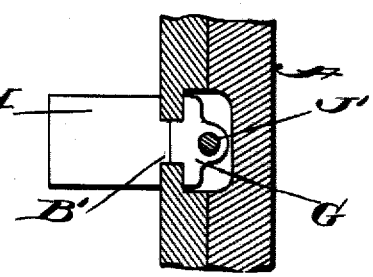
Witnesses
Inventor
H. B. Atha

UNITED STATES PATENT OFFICE.

HERBERT BURR ATHA, OF EAST ORANGE, NEW JERSEY.

METHOD OF MAKING COMPOSITE GEARS.

No. 814,342.　　　　Specification of Letters Patent.　　　　Patented March 6, 1906.

Application filed November 23, 1904. Serial No. 233,936.

*To all whom it may concern:*

Be it known that I, HERBERT BURR ATHA, residing at East Orange, in the county of Essex and State of New Jersey, have invented certain new and useful Improvements in Methods of Making Composite Gear, of which the following is a full, clear, and exact description, such as will enable others skilled in the art to which it appertains to make and use the same.

This invention relates to gears.

One of the objects thereof is to produce a gear the teeth of which will keep their proper shape for a much longer time than it is possible to do under the present process of manufacturing gears.

Another object thereof is to provide an efficient and inexpensive gear the outer part of which is removable when desired and yet is securely fixed in position, so as not to become loose or detached during use.

Another object is to provide a simple art of forming a gear of the above type.

Another object is to provide a gear of the above type in which the pitch-line is a true circle and the shaft is at the center thereof.

Another object is to provide an art peculiarly adapted to the formation of such a gear.

Other objects will be in part obvious and in part pointed out hereinafter.

The invention accordingly consists in the several steps and order and relation one to another of these steps and the features of construction, combinations of elements, and arrangement of parts, which will be exemplified hereinafter and the scope of the application of which will be indicated in the claims at the end of this description.

In order to render clearer the general nature of my invention, it may be noted that in gears as now constructed it is necessary to make them of steel so soft that the gear may be machined to a finished and accurate size. My process makes it possible to cast the teeth so accurately that it is practicable to grind the teeth to the proper shape without prohibitive expense, thus permitting the casting of a gear with teeth so hard that the gear is much more durable than those heretofore turned out. If the gear is cast from the same metal and at the same time, it is likely to become distorted in cooling and shrinking, as the parts will cool and shrink unevenly, and the radial arms of the gear will assist this uneven shrinking, thus throwing the pitch-circle out of true. Moreover, it may also be noted that if a gear of the ordinary construction be formed of the grade of metal ordinarily used for such purposes the teeth will wear rapidly, and also there is more liability of the teeth being broken off than if the gear were constructed of the metal and in the manner herein described by me. The above and other defects are remedied in constructions of the nature and made according to the art hereinafter described.

In carrying on my invention I cast an outer band provided with gear-teeth of a highgrade metal, preferably of steel so hard that it cannot be machined or milled by a cutting-tool. The teeth thus formed may be spur or bevel or any other desired type, and it may here be noted that the word "gear" is used throughout this specification and in the following claims in a broad sense as covering any form of gear or gear-teeth. After the casting has become cool pressure is applied to the outer surface thereof, so as to force the same into such shape that the pitch-circle will be approximately true. With the band held in this position the inner surface is ground to a true circle and preferably slightly tapered, the continuance of the external pressure insuring that this inner surface will be exactly concentric with respect to the pitch-circle and that the band will not be distorted by the grinding-tool. After the band has been formed, as above described, an accurately-turned core or "center," by which latter term it is intended to comprehend any form of mounting for the band, is forced within the same, the external pressure upon the band being maintained as before. These parts are so proportioned in size and shape as to require a considerable amount of force to drive the center in place, and it has been found that under such circumstances the band is so securely mounted as not to become loose or detached in use. The pressure upon the outer surface of the gear is then relieved and the teeth ground accurately to shape.

It may be here noted that, if desired, in the construction of an annular gear I may form teeth upon the inner surface of the band and force the member upon which the band is mounted about instead of within the same.

In the accompanying drawings, in which is shown a gear embodying certain features of my invention, Figure 1 is a plan of the same. Fig. 2 is a vertical section taken on the line 2 2 of Fig. 1. Fig. 3 is a plan view of a chuck for holding the outer band of the gear while the same is being trued up and held in place during the turning and securing operations. Fig. 4 is a section on line 4 of Fig. 3. Fig. 5 is a section on line 5 of Fig. 3. Fig. 6 is a section on line 6 of Fig. 3.

Similar reference characters refer to similar parts throughout the several views.

In the drawings, 1 represents a band formed as above described, having forced therein a center 2, the two contacting surfaces of these parts being smooth, as shown at 3.

The chuck is marked A on the drawings, and the body of the chuck is lettered B.

C represents screw-threaded shafts, as shown in the drawings. On the outer ends of these shafts are the beveled pinions D.

E is a circular rack fitted in the body B of the chuck and meshing with the pinions D.

F is a short shaft mounted in the main portion B of the chuck and having a pinion G on the inner end thereof, which also meshes with the circular rack E.

The parts lettered H are jaws which have downwardly-projecting lugs J, said lugs being screw-threaded at J', into which fit the screw-threaded shafts C. Upon turning the short shaft F the circular rack will be moved, which meshing with the pinions D will turn the shaft C and move the jaws H toward or from the center of the chuck, it being understood, of course, that the main portion B of the chuck is slotted, as shown at B', through which the lugs J of the jaws move. All of these jaws move simultaneously, and they can be adjusted to fit against the outer end of the teeth of the band edge to hold the said band in place while it is being operated upon.

The chuck disclosed by the new sheet of drawings and this description is an obvious construction, and no claim is laid to it.

This gear is used in the ordinary and obvious manner, and no description of its method of use is thought necessary.

It will thus be seen that I have provided a simple and efficient gear in which the teeth may be formed of a high grade of metal, which is too hard to be dressed, shaped, or milled by a cutting-tool, and the body of comparatively softer material, so that the hub may be cut as desired. In this manner the advantages above pointed out are attained, and a gear is provided in which the parts subject to severe wear and stresses are abundantly able to resist the same, and yet those parts in which the stresses are less are not formed of such a high grade of material as to render the gear unnecessarily expensive to finish. Also the band, including the teeth, is readily removable upon pressure being applied in the proper manner, and the same may be replaced in the case of wear or breaking without waste of the center of the gear.

It will also be noted that I have provided an art for forming a gear of the above type in which the teeth of the gear are made of metal of such high quality and hardness that it is necessary to finish the teeth by grinding, and this can be done at a minimum of skilled labor.

As my invention could be carried on and embodied in apparently widely different manners and forms without departing from the scope thereof, I desire that all matter herein set forth shall be interpreted as illustrative and not in a limiting sense.

I desire it also to be understood that the language used in the following claims is intended to cover all of the generic and specific features of the invention herein described, and all statements of the scope of the invention which as a matter of language might be said to fall therebetween.

Having described my invention, what I claim as new, and desire to secure by Letters Patent, is—

1. The art which consists in casting an annular member and integral teeth therewith, holding the member in a circular form, grinding the surface of the member opposite that upon which the teeth are cast, and forcing the same and a member to which it is to be connected into operative position with relation to each other.

2. The art which consists in casting an annular member having integral gear-teeth upon the outer surface thereof, grinding the inner surface of said member concentric with the pitch-circle of said gear-teeth, and forcing a center within the same.

3. The art which consists in casting an annular member having integral gear-teeth upon the outer surface thereof, holding the outer surface of said member in a circular form, grinding the inner surface of said member concentric with the pitch-circle of said gear-teeth, and forcing a center within the same.

4. The art which consists in casting an annular band having integral gear-teeth upon the outer surface thereof, pressing the outer surface of said band into a circular form, grinding the inner surface of said band concentric with the pitch-circle of said gear-teeth, and forcing a center within the same, said pressure upon the outer surface of said band being maintained during said grinding.

5. The art which consists in casting a band having integral gear-teeth upon the outer surface thereof, pressing the outer surface of said band into a circular form, grinding the inner surface of said band concentric with the pitch-circle of said gear-teeth, and forcing a center within the same, said pressure upon the outer surface of said band being maintained during said grinding and during the forcing of said center within said band.

In testimony whereof I affix my signature in the presence of two witnesses.

HERBERT BURR ATHA.

Witnesses:
   H. M. SEAMANS,
   F. R. RICHARDS.